US007571883B2

(12) United States Patent
Van Groesen et al.

(10) Patent No.: US 7,571,883 B2
(45) Date of Patent: Aug. 11, 2009

(54) DEVICE SUITABLE FOR SUPPORTING A COMPONENT (75) Inventors: Wilhelmus Maria Van Groesen, Tilburg (NL); Ewald Van Kuijk, Eindhoven (NL)

(73) Assignee: Vogel's Holding B.V., Eindhoven (NL)

( * ) Notice: Subject to any disclaimer, the term of this patent is extended or adjusted under 35 U.S.C. 154(b) by 214 days.

(21) Appl. No.: 11/290,141

(22) Filed: Nov. 29, 2005

(65) Prior Publication Data
US 2006/0186294 A1 Aug. 24, 2006

(30) Foreign Application Priority Data
Nov. 30, 2004 (NL) .................................. 1027626

(51) Int. Cl.
*E04G 3/00* (2006.01)
(52) U.S. Cl. ............................. 248/282.1; 248/292.12; 248/917; 248/274.1; 248/125.7; 248/284.1; 248/289.11; 248/125.9; 248/123.11; 248/918; 248/919; 248/920; 403/112; 403/113; 403/116; 403/148; 403/161; 74/39; 361/679.01; 361/679.02; 361/679.06
(58) Field of Classification Search ............. 248/282.1, 248/292.12, 917, 274.1, 125.7, 284.1, 289.11, 248/125.9, 123.11, 919, 918, 920; 403/112, 403/113, 116, 148, 161; 74/39; 16/354; 361/681, 682
See application file for complete search history.

(56) References Cited

U.S. PATENT DOCUMENTS

| | | | | |
|---|---|---|---|---|
| 741,382 A * | 10/1903 | Seifried | ............. | 248/278.1 |
| 899,769 A * | 9/1908 | Tideman | ............. | 248/124.1 |
| 4,055,329 A * | 10/1977 | Hammond | ............. | 254/424 |
| 4,589,621 A | 5/1986 | Hunt et al. | ............. | 248/586 |
| 5,241,716 A * | 9/1993 | Kohus | ............. | 5/99.1 |
| 6,102,348 A * | 8/2000 | O'Neill | ............. | 248/289.11 |
| 6,378,818 B1 * | 4/2002 | Padiak et al. | ............. | 248/201 |
| 6,799,749 B1 * | 10/2004 | Voegeli et al. | ............. | 254/126 |

(Continued)

FOREIGN PATENT DOCUMENTS

DE 44 42 642 A1 6/1996

(Continued)

*Primary Examiner*—J. Allen Shriver, II
*Assistant Examiner*—Nkeisha J Smith
(74) *Attorney, Agent, or Firm*—Ladas & Parry LLP (57) ABSTRACT A device suitable for supporting a component, such as a flat display screen, which device comprises a first arm, which can be connected to a wall with a first end thereof, being pivotable about a first pivot axis, and which is connected to a first end of a second arm with a second end thereof, being pivotable about a second pivot axis, which second arm can be connected to the component that is to be supported with a second end thereof, being pivotable about a third pivot axis. The device is furthermore provided with a third arm, which can be connected to the wall with a first end, being pivotable about a fourth pivot axis, and which is connected to a first end of a fourth arm with a second end, being pivotable about a fifth pivot axis, which fourth arm can be connected to the component to be supported with a second end, being pivotable about a sixth pivot axis. The third and the fourth arm are substantially in mirror symmetry with respect to the first and the second arm in practically any position of the arms.

10 Claims, 9 Drawing Sheets

U.S. PATENT DOCUMENTS

| | | | |
|---|---|---|---|
| 6,905,101 B1 * | 6/2005 | Dittmer | 248/274.1 |
| D520,017 S * | 5/2006 | van Kuijk et al. | D14/452 |
| D540,332 S * | 4/2007 | Dittmer et al. | D14/452 |
| 2003/0154673 A1 | 8/2003 | MacGregor et al. | 52/239 |
| 2006/0284037 A1 * | 12/2006 | Dittmer et al. | 248/285.1 |

FOREIGN PATENT DOCUMENTS

EP   1 471 300 A2   10/2004

* cited by examiner

DEVICE SUITABLE FOR SUPPORTING A COMPONENT

The invention relates to a device suitable for supporting a component, such as a flat display screen, which device comprises a first arm, which can be connected to a wall with a first end thereof, being pivotable about a first pivot axis, and which is connected to a first end of a second arm with a second end thereof, being pivotable about a second pivot axis, which second arm can be connected to the component that is to be supported with a second end thereof, being pivotable about a third pivot axis.

With such a device, as known from European patent application EP-A2-1 471 300, the second end of the second arm is provided with a support element that is pivotable about said third axis, which support element can be attached to a flat display screen. The support element furthermore enables the flat display screen to pivot about a horizontally extending axis with respect to the arms. The first, the second and the third pivot axis extend in vertical direction.

Such flat display screens are usually positioned parallel to a wall, substantially in contact therewith, when they are not in use. A user will place the flat screen in a desired position relative to the wall when he or she wishes to use the screen.

If the user were to pivot the flat display screen about the third pivot axis from the position of the flat display screen near and parallel to the wall, one end of the flat display screen would bump against the wall. This implies that there is a risk of the wall or the relatively expensive flat display screen being damaged. This is undesirable, of course. Consequently, a user must first move the flat display screen to a position in which it is spaced from the wall, with the first and the second arm being pivoted about the respective first and second pivot axes. Only then must the display screen be pivoted about the third pivot axis to the position that is desired by the user. Since the first and the second arm can freely pivot about the first and the second pivot axis, there is a possibility that the arms, in the position in which they are practically in contact with the wall, are either positioned one above another or in line with one another, The manner in which the user will have to move the display screen to the desired position depends on the position of the arms relative to each other.

The object of the invention is to provide a device by means of which a display screen can be moved with respect to the wall in an unequivocal manner.

This object is accomplished with the device according to the invention in that the device is provided with a third arm, which can be connected to the wall with a first end, being pivotable about a fourth pivot axis, and which is connected to a first end of a fourth arm with a second end, being pivotable about a fifth pivot axis, which fourth arm can be connected to the component to be supported with a second end, being pivotable about a sixth pivot axis, wherein the third and the fourth arm are substantially in mirror symmetry with respect to the first and the second arm in practically any position of the arms.

As a result of the mirror-symmetrical position with respect to a plane of symmetry of the first and the second arm on the one hand and the third and the fourth arm on the other hand, the second ends of the second and the fourth arm that are pivotally connected to the component will be moved in a direction parallel to the plane of symmetry upon pivoting of the arms. In the case of a usual arrangement, said plane of symmetry will extend transversely to the wall. Consequently, the component will automatically be moved in a direction transversely to the wall, towards the wall or away from the wall, upon pivoting of the arms.

One embodiment of the device according to the invention is characterized in that the first ends of the first and the third arm are pivotally interconnected, with pivoting of the first arm through a particular angle resulting in pivoting movement of the third arm through substantially the same angle in the opposite direction.

This achieves in a simple manner that the first and the third arm will be substantially in mirror symmetry with respect to one another in any position of the arms. As a result, the second and the fourth arm, which are connected to the first and the third arm, will automatically be in mirror symmetry with respect to one another as well.

Another embodiment of the device according to the invention is characterized in that the first ends of the first and the third arm are provided with meshing gear segments.

Since said gear segments are in mesh with each other, it can be ensured in a simple manner that angular displacement of the first arm will result in identical angular displacement of the third arm, albeit in opposite direction.

Another embodiment of the device according to the invention is characterized in that the first ends of the first and the third arm are provided with cylindrical segments, which are interconnected by means of a band that is passed over the cylindrical segments in the form of an S.

The use of such a band extending in the form of an S achieves that angular displacement of the first arm will cause the third arm to pivot through an identical angle in the opposite direction.

Yet another embodiment of the device according to the invention is characterized in that the third pivot axis and the sixth pivot axis coincide.

Because the third and the sixth pivot axis coincide, it is possible to have the component undergo a true pivoting movement relative to said two pivot axes, so that pivoting of the display screen about said pivot axis will result in a movement thereof that is unequivocal to the user.

Yet another embodiment of the device according to the invention is characterized in that the angle through which the component can pivot relative to the second and the fourth arm increases as the angle between the second and a fourth arm decreases.

If the angle between the second and the fourth arm is relatively large, the second and the fourth arm, and consequently the component, will be positioned relatively close to the wall. In such a position it is not desirable for the component to pivot through a large angle, as the component and the wall will collide in that case.

If the angle between the second and the fourth arm is smaller, the third pivot axis will be located further away from the wall, thereby enabling a larger pivoting angle between the component and the second and the fourth arm without components bumping against the wall.

Yet another embodiment of the device according to the invention is characterized in that the angle through which the component can pivot relative to the second and the fourth arm is limited by stops that are attached to the second and the fourth arm.

Said stops prevent the component from bumping against the arms themselves. In addition, the angle through which the component can pivot about the third and a sixth axis is determined in a simple manner by the position and the size of the stops.

Yet another embodiment of the device according to the invention is characterized in that the spacing between the stops attached to the second and the fourth arm will be larger when the angle between the second and the fourth arm is larger.

This means that in the case of a larger angle between the second and the fourth arm, the angle through which the component can be moved will be smaller than in the case of a smaller angle between the second and the fourth arm and consequently also a smaller spacing between the stops.

Another embodiment of the device according to the invention is characterized in that the second ends of the second and the fourth arm are provided with annular segments, in each of which annular segments one of said stops is positioned, whilst a support that can be connected to the component is positioned in said annular segments, which support is provided with contact surfaces that mate with said stops.

As a result of this construction, the stops and the contact surfaces that mate with the stops are not exposed to a user's view, Upon movement of the display screen, however, the user will experience that pivoting of the component, for example pivoting of the flat display screen about a vertical axis, is not possible until the display screen is spaced from the wall by some distance.

The invention will now be explained in more detail with reference to the drawings, in which.

Like parts are indicated by the same numerals in the figures.

Figure 1:
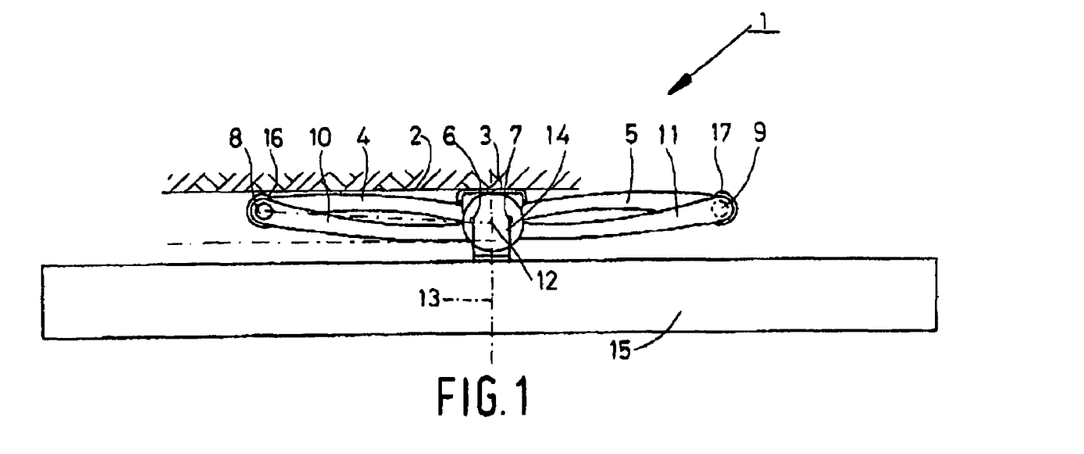
FIG. 1 is a top plan view of a device according to the invention, showing the device in a collapsed position thereof.

FIG. 1 shows a device 1 according to the invention, which is provided with a support plate 3 to be mounted to a wall 2, to which a first and a third pivot arm 4, 5 are pivotally connected about vertically extending pivot axes 6, 7. The pivot axes 6, 7 are located near first ends of the arms 4, 5. On sides remote from said first ends, the arms 4, 5 are connected to a second arm 10 and a fourth arm 11, respectively, with their second ends, being pivotable about pivot axes 8, 9. At their ends remote from the pivot axes 8, 9, the arms 10, 11 are pivotally interconnected about a common pivot axis 12. The first arm 4 and the second arm 10 are arranged in mirror symmetry with the third arm 5 and the fourth arm 11 with respect to a plane of symmetry 13. The second arm 10 and the fourth arm 11 are furthermore pivotally connected to a support 14 about the pivot axis 12, to which support 14 a display screen 15 is connected. The support 14 and the display screen 15 can jointly pivot relative to the second and the fourth arm 10, 11 through an angle whose magnitude depends on the position of the display screen 15 with respect to the wall 2.

In the collapsed position that is shown in FIG. 1, pivoting of the display screen 1 about the pivot axis 12 is hardly possible, if at all, so as to prevent ends of the display screen 15 from bumping against the wall 2.

Figure 2:
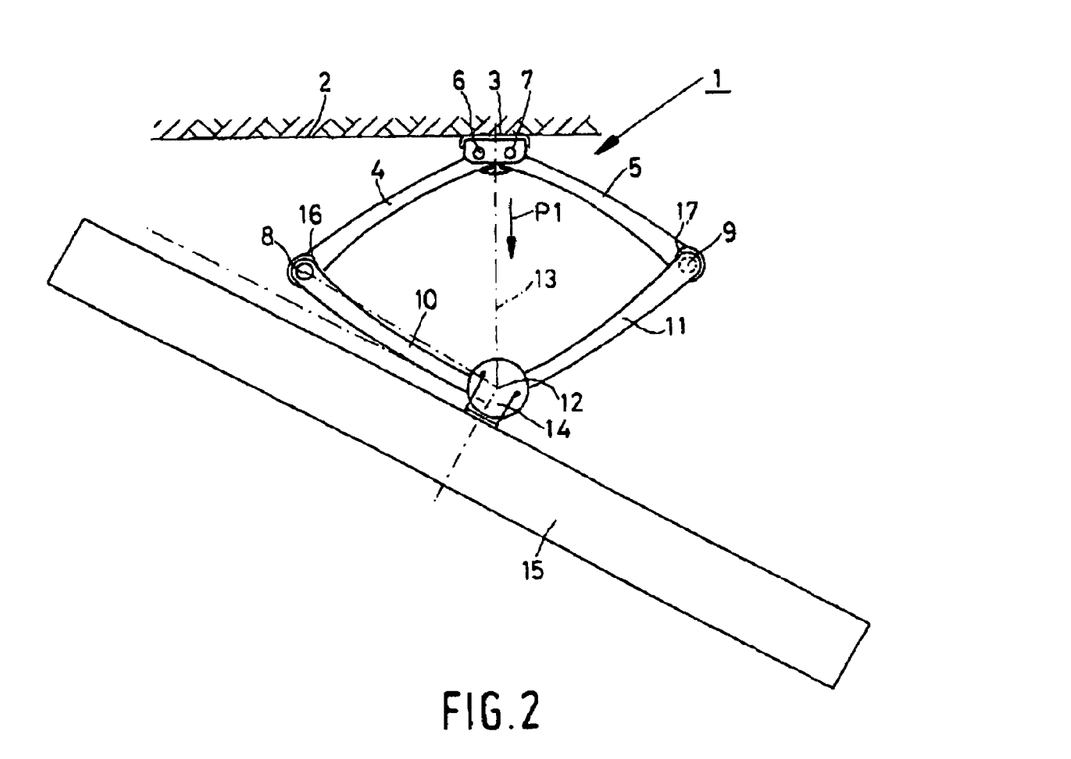
FIG. 2 is a top plan view of the device of FIG. 1, showing the device in an intermediate position thereof.

FIG. 2 shows the device 1 of FIG. 1 in an intermediate position thereof, in which position the first and the third arm 4, 5 have slightly pivoted towards each other. The arms 10, 11 have pivoted towards each other as well, as a result of which the pivot axis 12 connected to the ends of the arms 10, 11 has been moved in a direction away from the wall 2 as indicated by the arrow P1, substantially parallel to the plane of symmetry 13. As FIG. 2 clearly shows, the plane of symmetry 13 extends transversely to the wall 2. In this intermediate position, the display screen 15 can pivot from a position in which it extends parallel to the wall 2 to the position in which it extends substantially parallel to the second arm 10 (as shown in FIG. 2) and to a position in which it extends substantially parallel to the fourth arm 11. The display screen 15 will not come into contact with the wall 2 in any of these positions, as the display screen 15 is spaced sufficiently far from the wall 2.

At their ends located near the pivot axes 8, 9, the arms 10, 11 are provided with projections 16, 17, which, in the position that is shown in FIG. 1, can abut against the wall 2. Said projections, which are preferably made of a relatively soft material, prevent the arms 4 of 5 from bumping against the wall 2 in a simple manner.

In the position that is shown in FIG. 2, the projections 16, 17 have pivoted jointly with the arms 10, 11 to a position above the arms 4, 5, so that the projections 16, 17 do not mar the taut appearance of the arms 4, 5, 10, 11.

Figure 3:
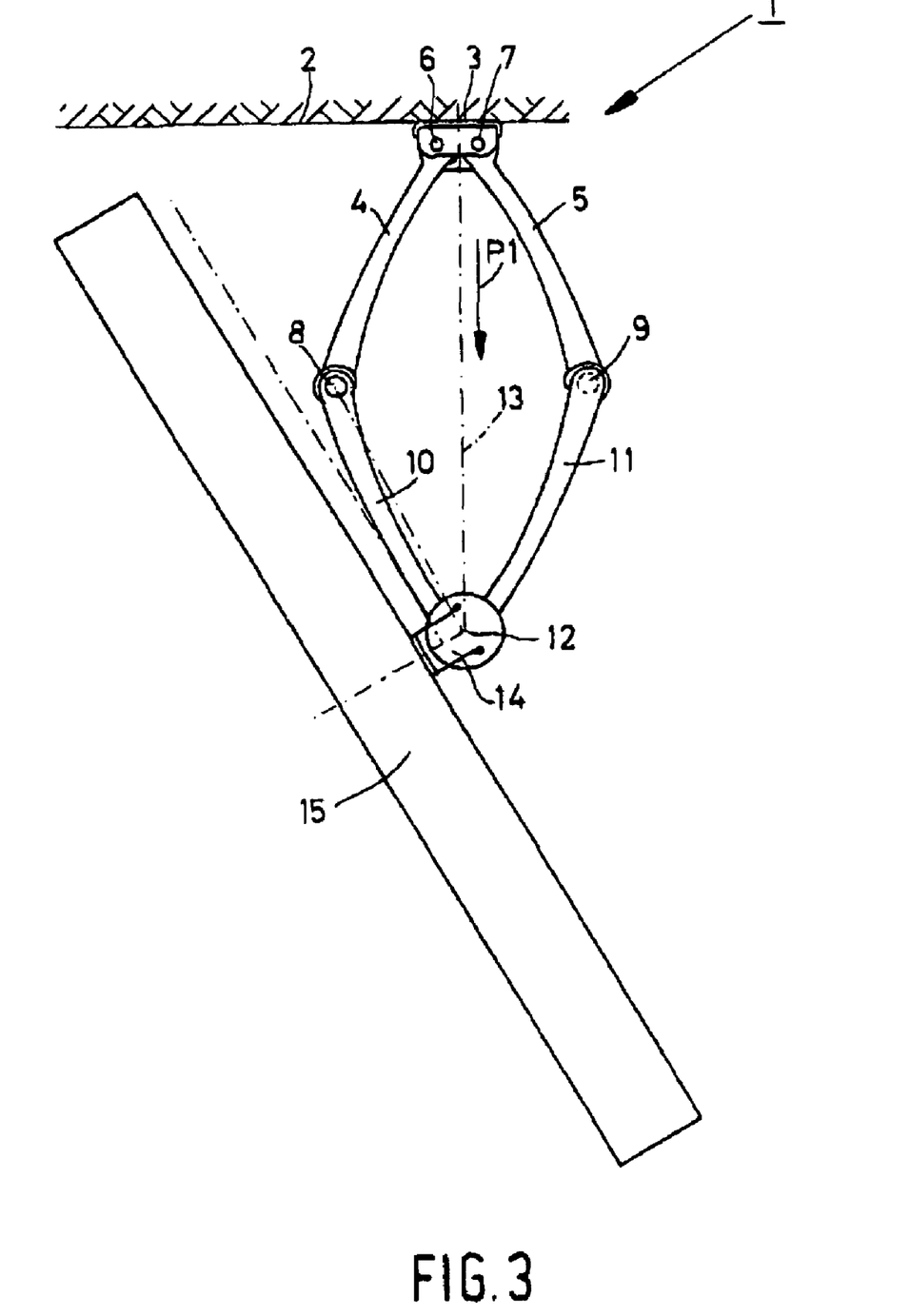
FIG. 3 is a top plan view of the device of FIG. 1, showing the device in an end position thereof.

FIG. 3 is a top plan view of the device of FIG. 1, showing the device in an end position thereof, in which the arms 4, 5, 10, 11 have pivoted even further towards each other and are now positioned closer to the plane of symmetry 13. This has resulted in the support 14 connected to the component 15 being moved further in the direction indicated by the arrow P1, so that it is now positioned further away from the wall 2. In this position, the display screen 15 and the support 14 can jointly pivot through a relatively large angle, without the risk of the display screen 15 bumping against the wall 2.

Figure 4:
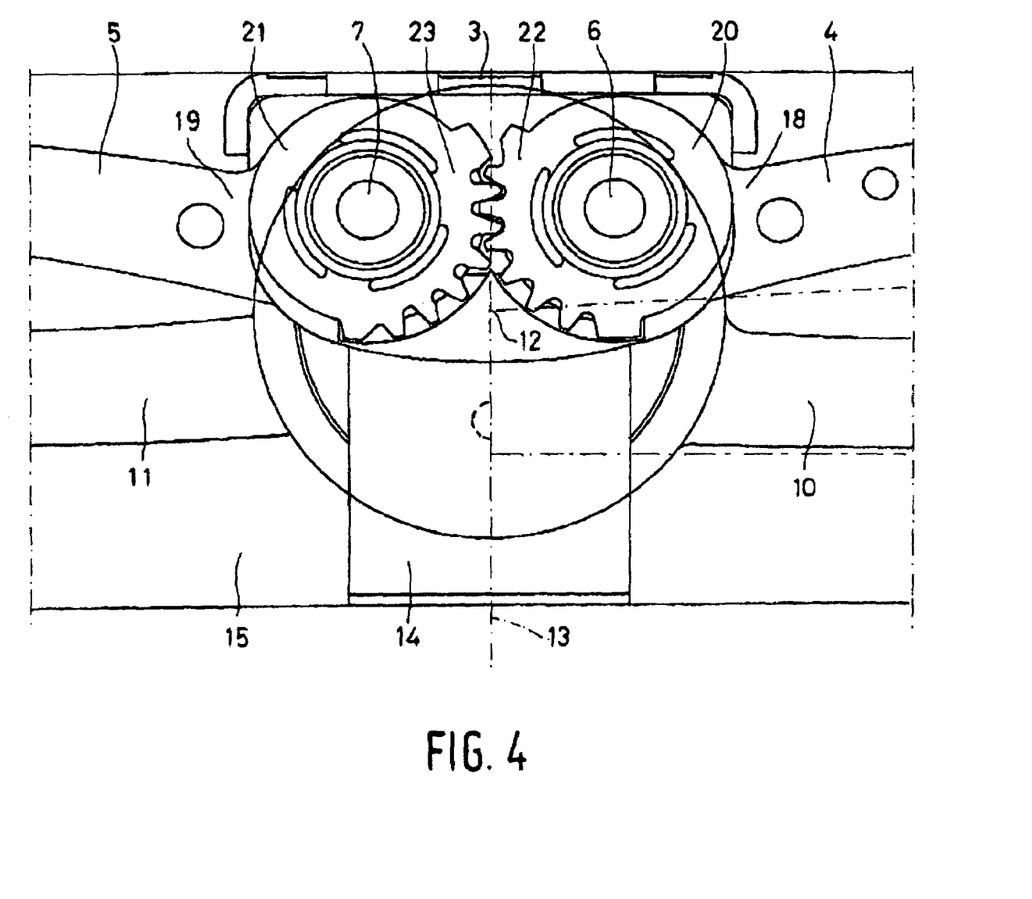
FIG. 4 is a bottom plan view of a part of the device of FIG. 1, showing the device in the collapsed position thereof.

FIG. 4 is a bottom plan view of a part of the device 1 that is shown in FIG. 1. As the figure clearly shows, the first ends 18, 19 of the first arm 4 and the third arm 5 are provided with circular-cylindrical segments 20, 21, which are provided with meshing gear segments 22,23 along part of their circumference.

Since the ends 18, 19 of the arms 4, 5 are in mesh with each other, angular displacement of one of the arms 4, 5 will automatically result in angular displacement of the other arm in the opposite direction through an angle of identical magnitude.

Figure 5:
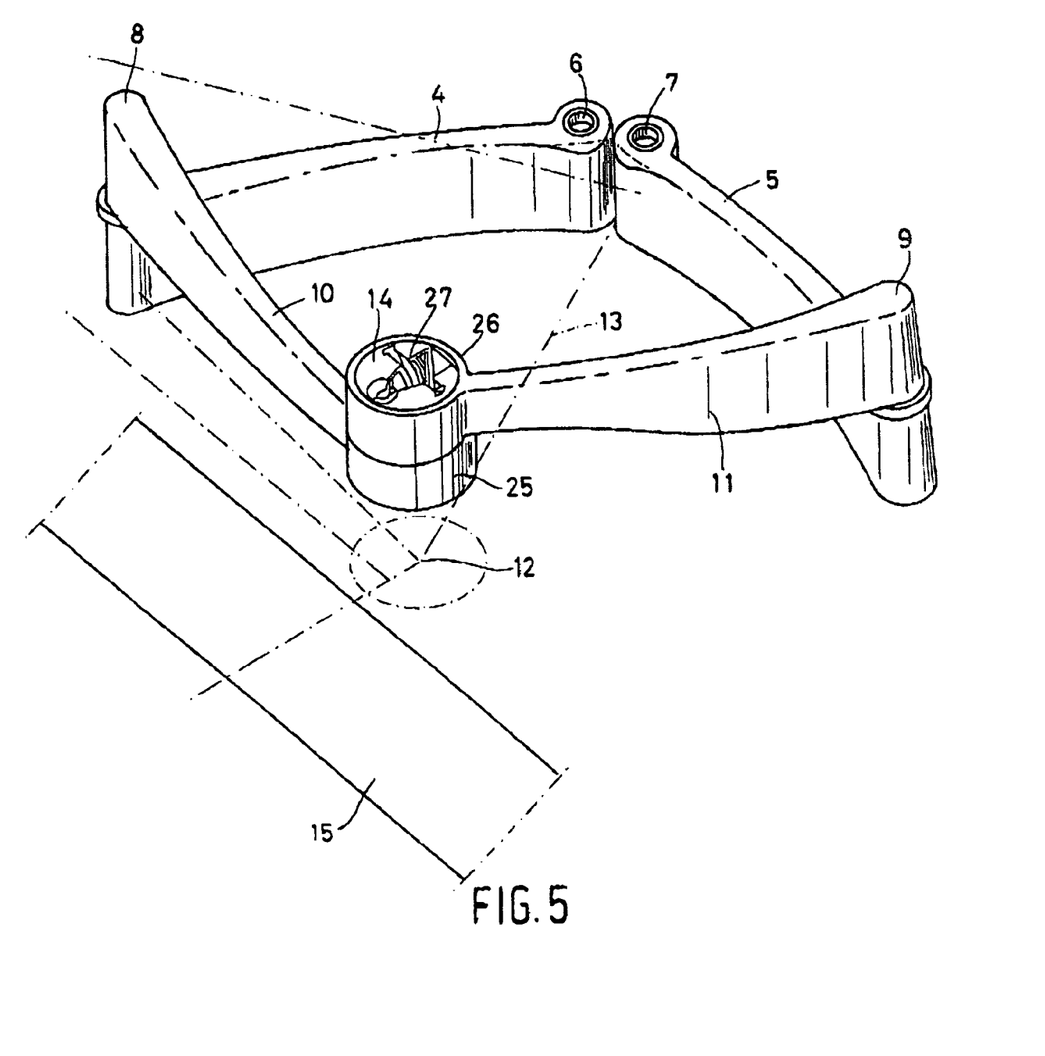
FIG. 5 is a perspective view of the device of FIG. 1, showing the device in an intermediate position thereof.
Figure 6:
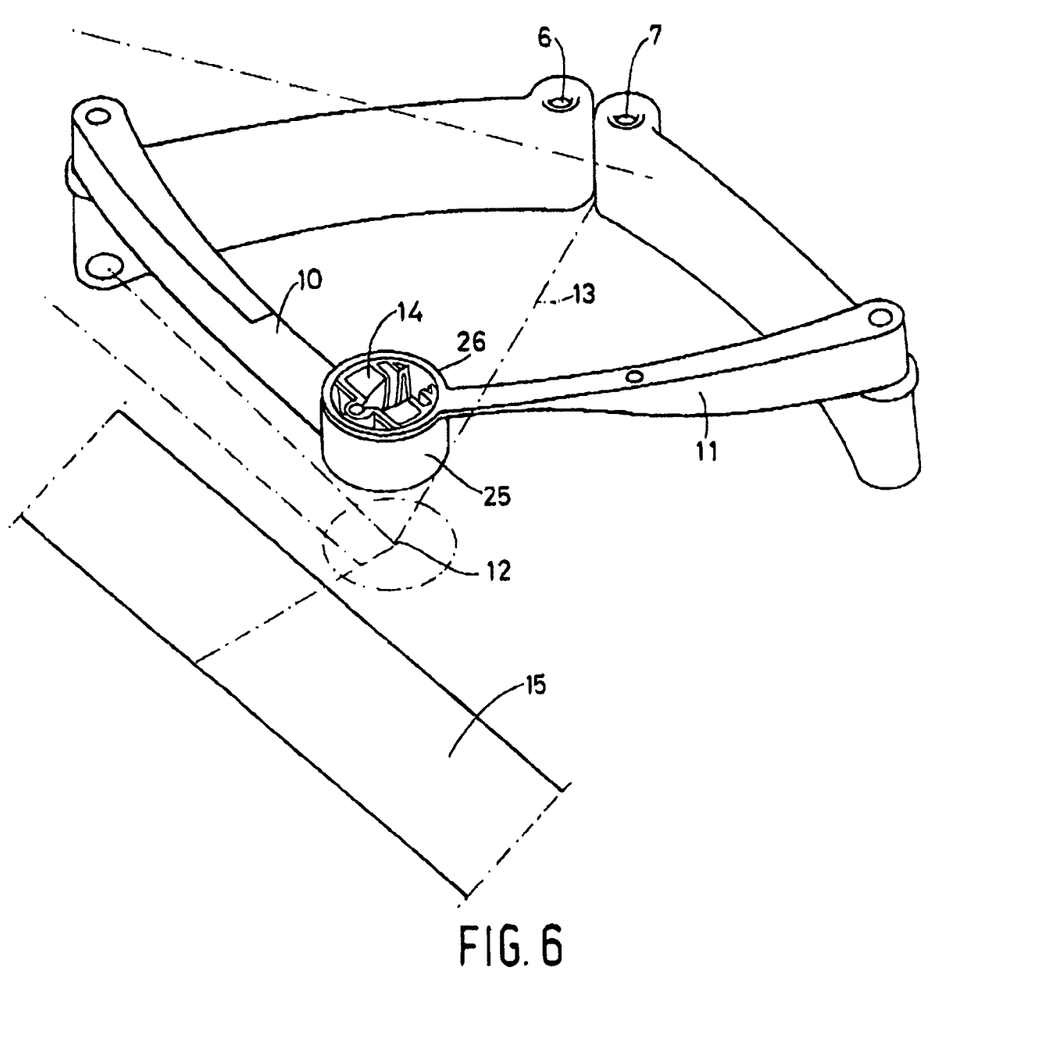
FIG. 6 is a perspective view of a partially sectioned device as shown in FIG. 5.

FIGS. 5 and 6 are a perspective view and a partial sectional view, respectively, of the device 1 of FIG. 1, showing the device in an intermediate position thereof. The support 14 to which the display screen 15 is connected is clearly shown in said figures. The arms 10, 11 are provided with annular segments 25, 26 at their second ends, in which annular segments the cylindrical support 14 is positioned. The cylindrical support 14 is provided with an arcuate recess 27, in which an arcuate bracket (not shown) is movably accommodated. The arcuate bracket is connected to the display screen 15 with ends thereof. Movement of the arcuate bracket in the arcuate recess 27 enables the display screen 15 to pivot about a horizontally extending axis. Such pivoting may take place similarly to the manner described in the aforesaid European patent application EP-A2-1,471,300 of the Applicant.

Figure 7:
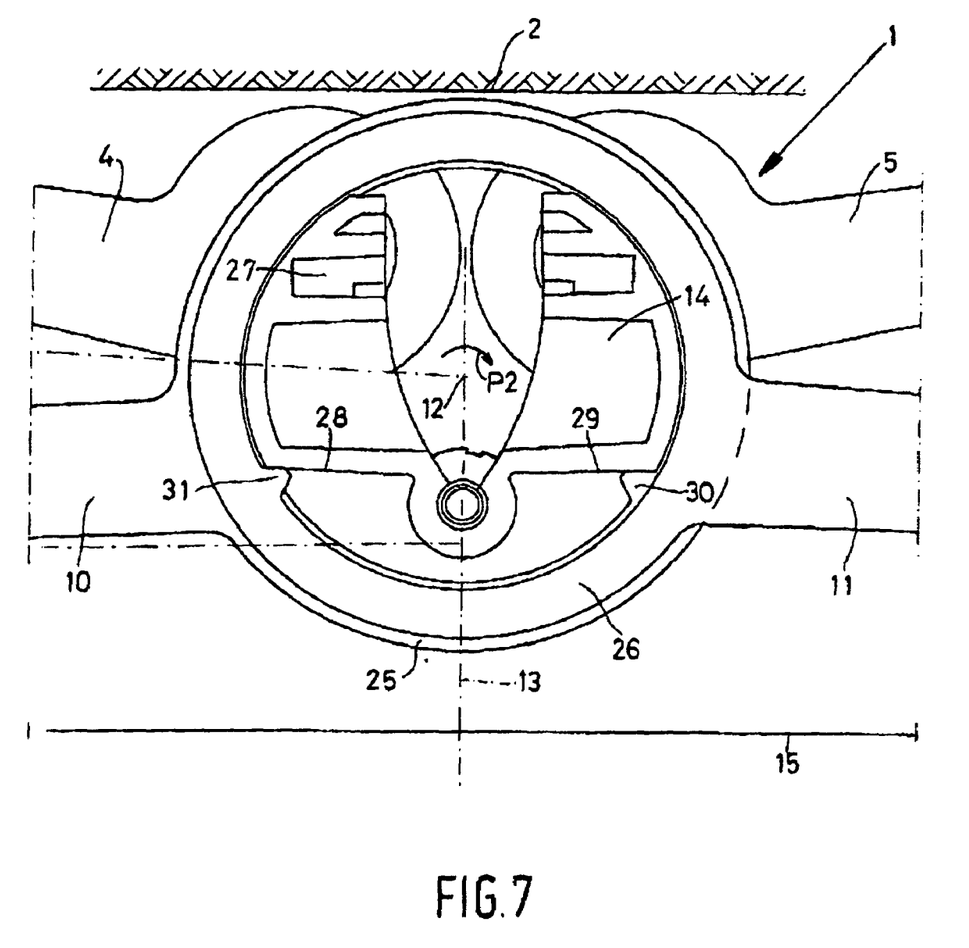
FIG. 7 is a top plan view of a detail of the device of FIG. 1, showing the device in the collapsed position thereof.

FIG. 7 is a top plan view of the device 1 of FIG. 1, showing the device in the collapsed position thereof, in which the support 14 is clearly visible. The support 14 has two contact surfaces being symmetrically disposed with respect to the plane of symmetry 13, which, in the collapsed position that is shown in FIG. 7, abut against stops 30, 31 being attached to, respectively, the annular segment 25 of the second arm 10 and the annular segment 26 of the fourth arm 11.

Pivoting of the support 14 about the pivot axis 12 in the direction indicated by the arrow P2 is rendered impossible as a result of the abutment of the contact surface 29 against the stop 30. Similarly, pivoting of the support 14 about the pivot axis 12 in the opposite direction of the arrow P2 is rendered impossible as a result of the abutment of the contact surface 28 against the stop 31.

Figure 8:
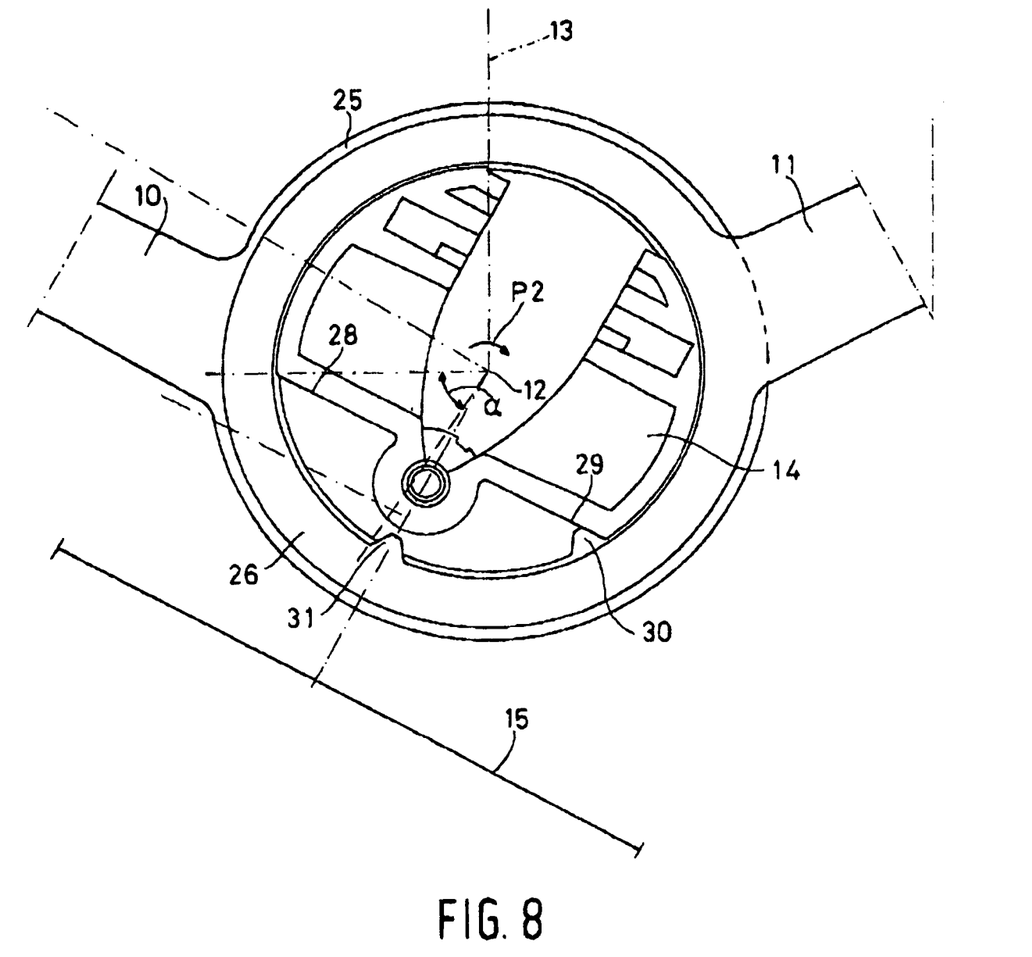
FIG. 8 is a top plan view of a detail of the device of FIG. 1, showing the device in an intermediate position thereof.

FIG. 8 is a view similar to FIG. 7, in which the device 1 is shown in an intermediate position rather than in a collapsed position. In this intermediate position, the display screen 15 can pivot from a position in which it extends transversely to the plane of symmetry 13 to the position that is shown in FIG. 8, in which the display screen 15 extends substantially parallel to the second arm 10. Further pivoting of the support 14 and the display screen 15 connected thereto in the direction indicated by the arrow P2 is rendered impossible as a result of the abutment of the contact surface 29 against the stop 30 that is attached to the second arm 10. From the position of the display screen 15 that is shown in FIG. 8, the display screen 15 can pivot through an angle α in the opposite direction of the arrow P2, to a position in which the display screen 15 extends substantially parallel to the fourth arm 11 and in which the contact surface 28 abuts against the stop 31 that is attached to the arm 11.

Figure 9:
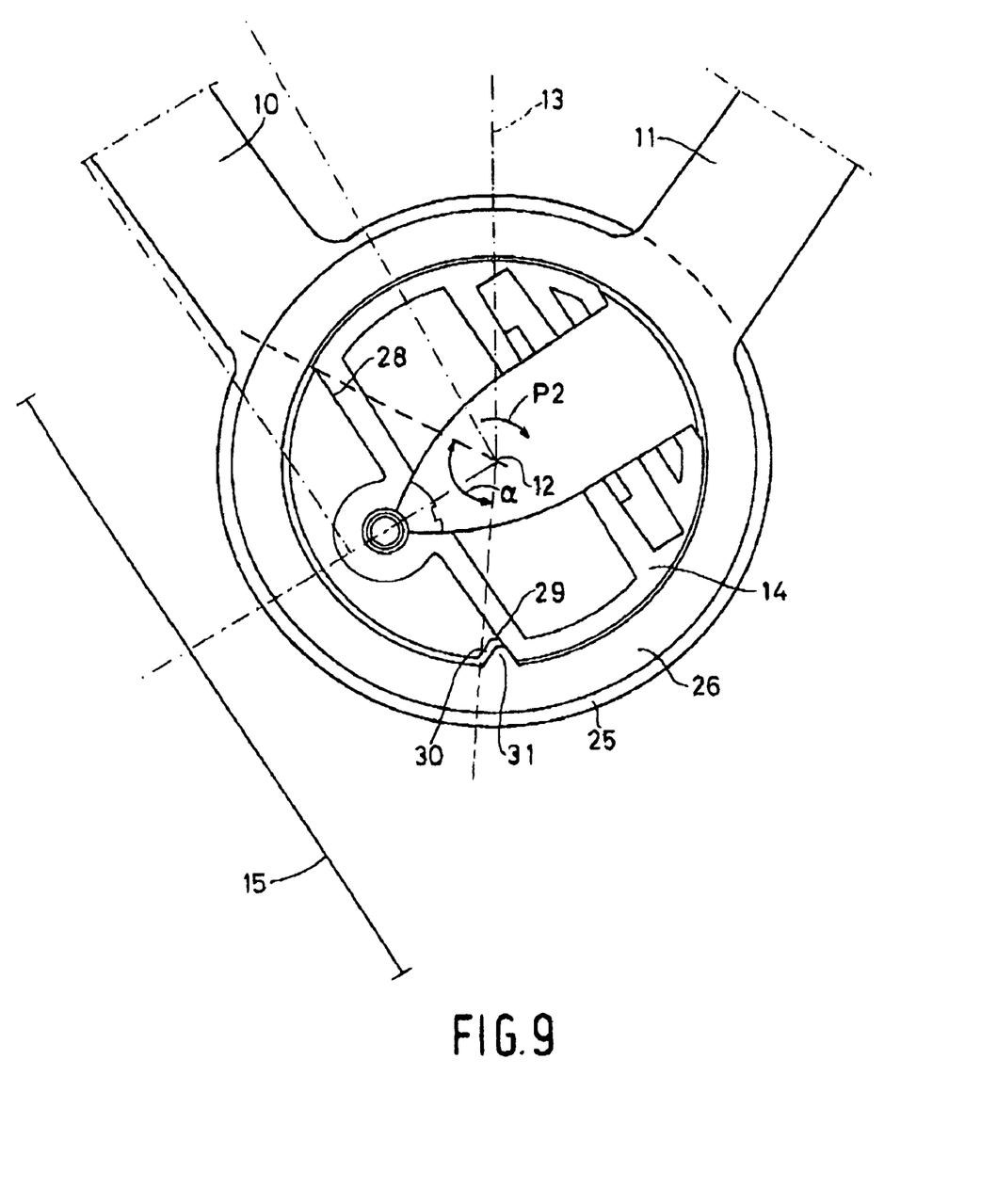
FIG. 9 is a top plan view of a detail of the device of FIG. 1, showing the device in an end position thereof.

FIG. 9 is a view similar to FIG. 8, in which the device 1 is shown in the end position, however. Said end position may be defined in that further pivoting of the gear segments 22, 23 with respect to each other is not possible.

The stops 30, 31 are positioned substantially one above the other in this end position, thus realising a maximum pivoting angle α of the support 14 and the display screen 15 connected to the support 14. In the position that is shown in FIG. 9, the display screen 15 extends substantially parallel to the second arm 10.

Further pivoting of the display screen 15 in the direction indicated by the arrow P2 is prevented in that the contact surface 29 abuts against the stop 30 that is attached to the arm 10. The display screen 15 can pivot through an angle α in the opposite direction of the arrow P2 to a position in which the display screen 15 extends parallel to the fourth arm 11 and in which the contact surface 28 abuts against the stop 31 that is attached to the arm 11.

Since the stops 30, 31 are positioned in the annular segments 25, 26, said stops are not exposed to a user's view, although a user can perceive their presence. When a user takes hold of one end of the display screen 15 in the position of the display screen 15 that is shown in FIG. 1, in order to pivot the display screen 15 about the pivot axis 12, such pivoting will automatically result in movement of the pivot axis 12 in a direction away from the wall 2 as indicated by the arrow P1. In this way the display screen 16 is automatically prevented from bumping against the wall 2, so that a user will not have to pay attention to this himself or herself.

Furthermore, as the stops 30, 31 are positioned in the annular segments 25, 26 of the arms 10, 11, said stops are not accessible to the user, so that they cannot be accidentally removed, which might lead to the display screen 15 bumping against the wall 2 yet. Moreover, the positions of the stops 30, 31 relative to the arms 10, 11 can be optimised during manufacture. With the embodiment that is shown in the drawings, the display screen 15 will not bump against the wall 2, but it will not come into contact with the arms 10, 11, either, so that damage to the arms or the display screen is prevented in a simple manner.

Figure 10:
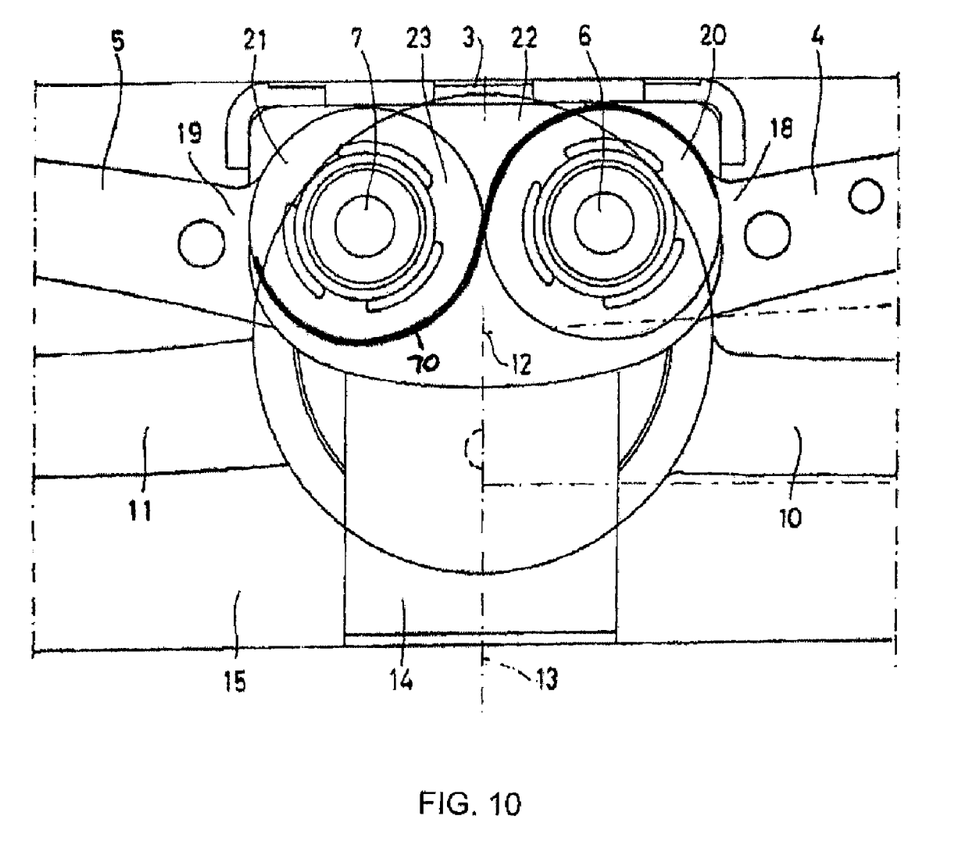
FIG. 10 depicts cylindrical segments that are interconnected by means of a band that is passed over the cylindrical segments in the form of an S.

As shown in FIG. 10, it is also possible to interconnect the circular-cylindrical segments 20, 21 that are attached to the arms 4, 5, for example by means of a steel band 70 which is passed over the circular segments 20, 21 in the form of an S, so that pivoting of the arms 4, 5 will cause the band to be unwound from one circular segment whilst simultaneously being wound onto the other circular segment.

It is also possible to have the axes 6, 7 coincide and realise a coupling of the opposed angular displacements of the arms 4, 5 in a different manner.

It is also possible to integrate said coupling of the opposed angular displacements in the interconnected ends of the second arm 10 and the fourth arm 11.

Furthermore it is possible to position the stops on the outer side of the arms 10, 11, near the centre thereof. In such a case the display screen 15 will come into contact with said stops present on the outer side of the arms 10, 11. A drawback in this connection, however, is the fact that the angular displacement depends partially on the dimension of the display screen 15 at a position opposite said stops.

It is also possible to provide the stops only on the second or the fourth arm.

It is also possible, of course, to use the device for supporting a different type of component, such as a loudspeaker, a drying platform, etc.

The invention claimed is:

1. A device suitable for supporting a component, the device comprising:
   a first pair of pivotally connected arms having a first end configured to be pivotally connected with a wall and a second end configured to be pivotally connected with the component;
   a second pair of pivotally connected arms having a first end configured to be pivotally connected with the wall and a second end configured to be pivotally connected with the component, the first pair of pivotally connected arms and the second pair of pivotally connected arms are configured to position the component away from the wall along an axis that is substantially perpendicular to the wall and are configured to pivot the component at an angle to the axis;
   a first stop associated with the second end of the first pair of pivotally connected arms and limiting the pivotal movement of the component in a first direction that is at the angle to the axis without limiting the pivotal movement of the component in a second direction that is opposite the first direction;
   a second stop associated with the second end of the second pair of pivotally connected arms and limiting the pivotal movement of the component in the second direction without limiting the pivotal movement of the component in the first direction, the first pair of pivotally connected arms and the second pair of pivotally connected arms are shortening the distance between the first stop and the second stop as the component is positioned away from the wall along the axis.

2. A device according to claim 1, wherein the first end of the first pair of pivotally connected arms and the first end of the second pair of pivotally connected arms are provided with meshing gear segments.

3. A device according to claim 1, wherein the first end of the first pair of pivotally connected arms and the first end of the second pair of pivotally connected arms are provided with cylindrical segments, wherein the cylindrical segments are interconnected by means of a band that is passed over the cylindrical segments in the form of an S.

4. The device according to claim 1, wherein the angle through which the component can pivot relative to the axis increases as the distance of the component away from the wall along the axis increases.

5. The device of claim 1, wherein the first stop extends from the second end of the first pair of pivotally connected arms and the second stop extends from the second end of the second pair of pivotally connected arms.

6. The device of claim 1, wherein the second end of the first pair of pivotally connected arms is provided with a first annular segment with the first stop positioned on the inner surface of the first annular segment and the second end of the second pair of pivotally connected arms is provided with a second annular segment with the second stop positioned on the inner surface of the second annular segment.

7. The device of claim 5, further comprising:
a support member configured to pivotally connect the component with the first pair of pivotally connected arms and the second pair of pivotally connected arms, the support member comprising:
  a cylindrical body configured to be positioned within the first annular segment and the second annular segment;
  a first contact surface configured to abut the first stop; and
  a second contact surface configured to abut the second stop.

8. A device suitable for supporting a component, the device comprising:
a first pair of pivotally connected arms having a first end configured to be pivotally connected with a wall and a second end configured to be pivotally connected with the component;
a second pair of pivotally connected arms having a first end configured to be pivotally connected with the wall and a second end configured to be pivotally connected with the component, the first pair of pivotally connected arms and the second pair of pivotally connected arms are configured to position the component away from the wall along an axis that is substantially perpendicular to the wall and are configured to pivot the component at an angle to the axis;
a first projection associated with the first pair of pivotally connected arms configured to prevent the first pair of pivotally connected arms from contacting the wall when the component is positioned adjacent to the walL
a first stop associated with the second end of the first pair of pivotally connected arms and limiting the pivotal movement of the component in a first direction that is at the angle to the axis without limiting the pivotal movement of the component in a second direction that is opposite the first direction; and
a second stop associated with the second end of the second pair of pivotally connected arms and limiting the pivotal movement of the component in the second direction without limiting the pivotal movement of the component in the first direction, the first pair of pivotally connected arms and the second pair of pivotally connected arms are shortening the distance between the first stop and the second stop as the component is positioned away from the wall along the axis.

9. The device of claim 1, wherein the first stop is configured to prevent the component from contacting the wall when the component is pivoted in the first direction.

10. The device of claim 1, wherein the second stop is configured to prevent the component from contacting the wall when the component is pivoted in the second direction.

* * * * *